(No Model.)
E. A. HARRIS.
MACHINE FOR CUTTING VENEERS.
No. 374,598. Patented Dec. 13, 1887.
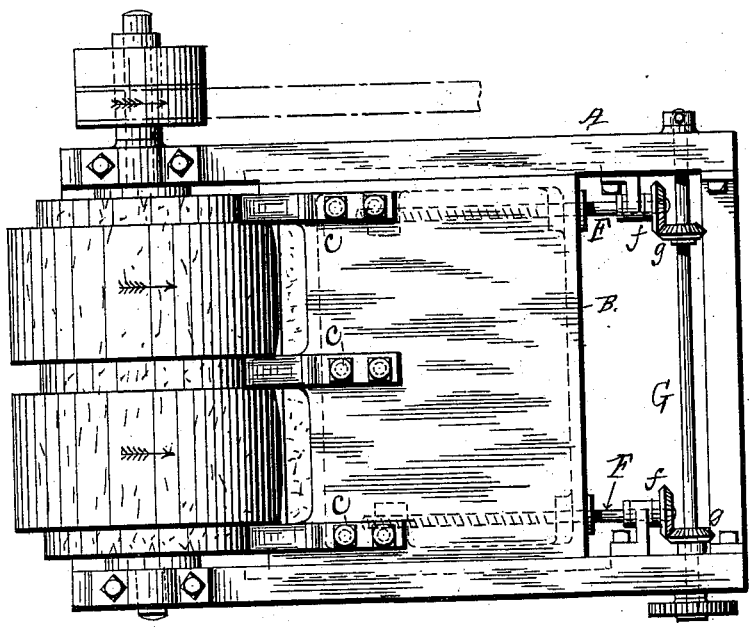
FIG. I.
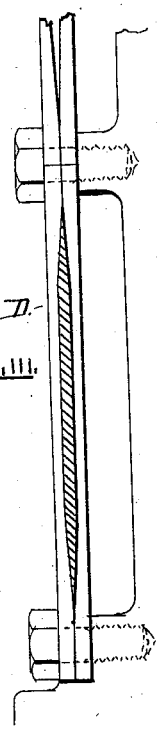
FIG. III.
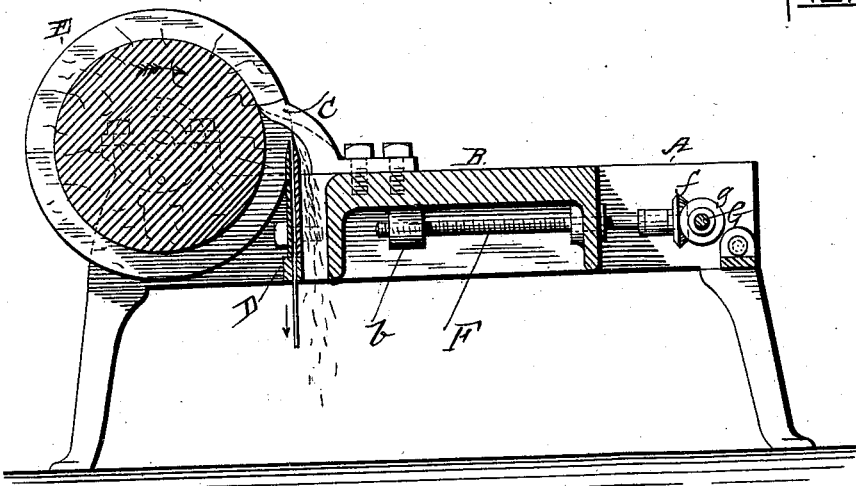
FIG. II.
WITNESSES:
Cornelius P. White
Dav. L. D. Gro
INVENTOR.
Ernest A. Harris
By Walter B. Vincent Atty

UNITED STATES PATENT OFFICE.

ERNEST A. HARRIS, OF MECHANIC FALLS, MAINE.

MACHINE FOR CUTTING VENEERS.

SPECIFICATION forming part of Letters Patent No. 374,598, dated December 13, 1887.

Application filed June 2, 1887. Serial No. 240,016. (No model.)

*To all whom it may concern:*

Be it known that I, ERNEST A. HARRIS, of Mechanic Falls, in the State of Maine, have made certain new and useful Improvements in Machines for Cutting Veneers; and I do hereby declare that the following specification, taken in connection with the drawings making a part of the same, is a full, clear, and exact description thereof.

Figure 1 is a plan of my improved machine. Fig. 2 is a vertical section of same. Fig. 3 is a rear view of the cutter.

My invention is especially designed to cut veneers with a thin edge upon each side, to be subsequently cut into tooth-picks; and it consists in the devices and combinations for that purpose hereinafter described.

In the drawings, A is an elevated frame or bed-plate in which is a sliding carriage, B. To the carriage B cutters C C C and D are attached.

E is the log, which is centered to rotate in the direction of the cutters.

D is a cutter or double knife, the two parts of which converge at the outer ends, as shown in Fig. 3. The cutter D is bolted to the end of the carriage B and stands in a vertical position, as shown in Fig. 2.

Upon the top of the carriage B are bolted cutters C C C, which define the width of the veneer, and also provide a path for the travel of the projecting nuts, which are required to secure the cutter D in place. As fast as the log is cut away, the carriage and cutters will be advanced by means of suitable feeding mechanism. This feeding mechanism may, as shown in the drawings, consist of a screw-rod, F, threaded into a threaded projection, $b$, on the table B. The rod F is provided with a gear, $f$, which meshes into a gear, $g$, on the shaft G, which receives rotation in any suitable manner. The rod F, and gears $f$ and $g$ may be duplicated, as shown in Fig. 1, or any other form of feeding mechanism may be substituted for such. It will now be readily seen that as the log rotates against the cutter D a veneer thin upon both edges will be cut therefrom.

What I claim as my invention, and desire to secure by Letters Patent, is—

1. In a machine for cutting veneers, the combination, with the carriage, feeding mechanism therefor, and log-support, of the double knife D, mounted on the front of the carriage, said double knife having its edges converged at the ends, substantially in the manner and for the purpose set forth.

2. In a machine for cutting veneers, the combination, with the carriage B, having suitable feeding mechanism, of the cutters C C C, secured upon the carriage for cutting grooves in the log to define the width of the veneer, and the double knife D, set vertically on the front of the carriage and having its edges converged at the ends for shaping the edges of the veneer, in the manner and for the purpose set forth.

ERNEST A. HARRIS.

Witnesses:
WALTER B. VINCENT,
CORNELIUS P. WHITE.